J. A. Vaughn,
Wind Wheel.

No. 99,980. Patented Feb. 15, 1870.

Witnesses.
Wm Gerlach
Geo. H. Strong

Inventor.
Jerome A. Vaughn

United States Patent Office.

JEROME A. VAUGHN, OF DOWNIEVILLE, CALIFORNIA.

Letters Patent No. 99,980, dated February 15, 1870.

IMPROVEMENT IN HORIZONTAL WIND-WHEELS.

The Schedule referred to in these Letters Patent and making part of the same.

*To all whom it may concern:*

Be it known that I, JEROME A. VAUGHN, of Downieville, county of Sierra, State of California, have invented an Improved Horizontal Windmill; and I do hereby declare the following description and accompanying drawings are sufficient to enable any person skilled in the art or science to which it most nearly appertains to make and use my said invention or improvements, without further invention or experiment.

The object of my invention is to construct an improved horizontal windmill in which the vanes are alternately opened and closed by the action of the wind as they turn, the two on opposite sides being connected by rods extending across within the frame.

To more fully explain my invention, reference is made to the accompanying drawings forming a part of this specification, of which—

A A are the two rims lying in parallel horizontal planes, and connected together by vertical posts or slats B, the distance between the rims being equal to the proposed width of the vanes.

These vanes C C may be solid, or they may be composed of frames covered with canvas or equivalent material, as here shown, and the inner or pivot ends are attached to posts D D having pintles above and below, turning in the rims A A.

The outer edges of the vanes have hinged to them rods G G, each rod connecting the pair most nearly opposite each other, as shown.

Sides of canvas or thin wood H may be extended around between the rims and the posts B, and horizontal slots are cut through so as to allow the rods G to play back and forward.

Figure 1:
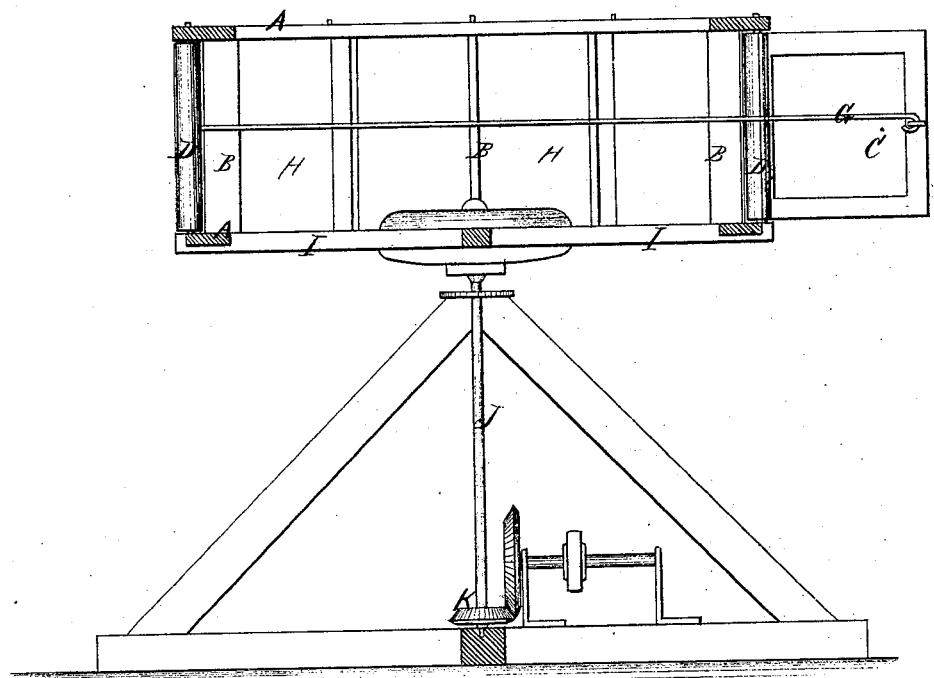
Figure 1 is a side sectional elevation.
Figure 2:
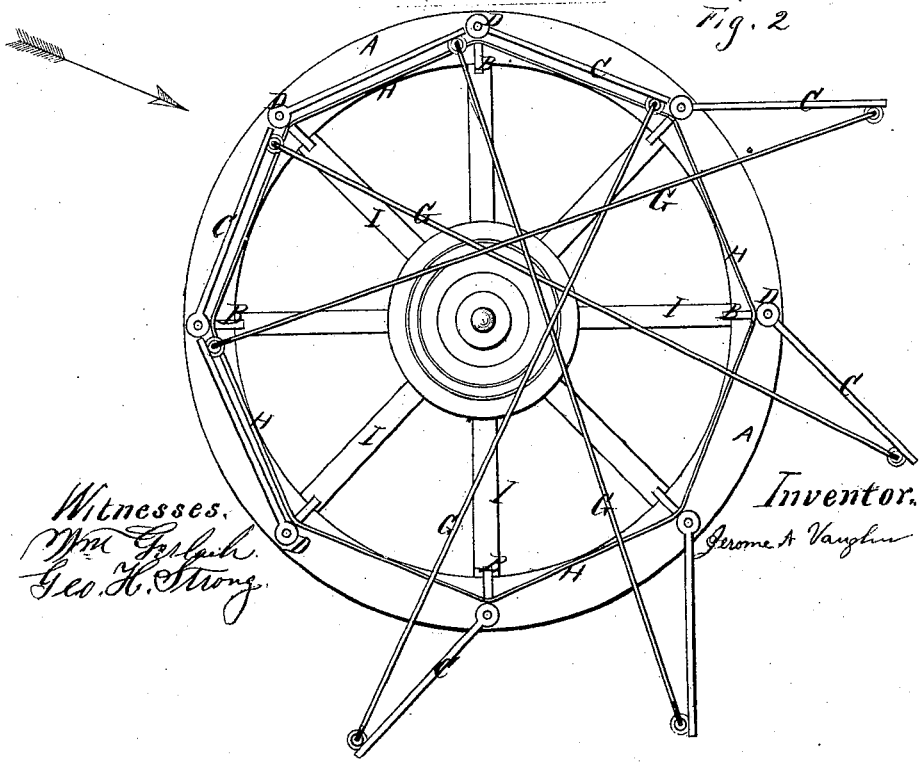
Figure 2 is a plan.

Fig. 2 will show more clearly the operation of my windmill, the wind being represented as coming from the direction of the arrow.

As the opened vanes begin to move toward the wind in their revolution, the pressure against their backs will begin to close them and open the vanes opposite, which are connected by the rods G.

As soon as these are partially opened by this means, the force of the wind will complete their extension and the closing of the opposite and returning vane.

This occurs successively with each pair of vanes when they reach the proper position, so that there will be a constant force to drive the mill.

The lower rim A is mounted on arms I which extend to a central hub and serve to support the mill.

The driving shaft J carries a pinion, K, at its lower end or at some convenient point, and from this such machinery as may be needed is driven.

What I claim, and desire to secure by Letters Patent, is—

A horizontal windmill having the vanes C pivoted at one side, and operated by the rods G connecting the outer edges of each pair of opposite vanes so as to cause one to open and the other to close simultaneously, as herein described.

In witness whereof I have hereunto set my hand and seal.

JEROME A. VAUGHN. [L. S.]

Witnesses:
 WM. GERLACH,
 GEO. H. STRONG.